A. A. GREENICK.
ROASTER.
APPLICATION FILED MAY 11, 1920.

1,394,412.

Patented Oct. 18, 1921.

Austin A. Greenick
INVENTOR

BY Victor J. Evans
ATTORNEY

WITNESS:

UNITED STATES PATENT OFFICE.

ARTHUR A. GREENICK, OF BUFFALO, NEW YORK.

ROASTER.

1,394,412.   Specification of Letters Patent.   Patented Oct. 18, 1921.

Application filed May 11, 1920. Serial No. 380,619.

*To all whom it may concern:*

Be it known that I, ARTHUR A. GREENICK, a citizen of the United States, residing at Buffalo, in the county of Erie, and State of New York, have invented new and useful Improvements in Roasters, of which the following is a specification.

This invention relates to a roasting receptacle and the principal object of the invention is to provide means whereby the article being roasted can be turned without opening the receptacle.

Another object of the invention is to separate the roasting compartment from the heating chamber.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which—

Figure 1:
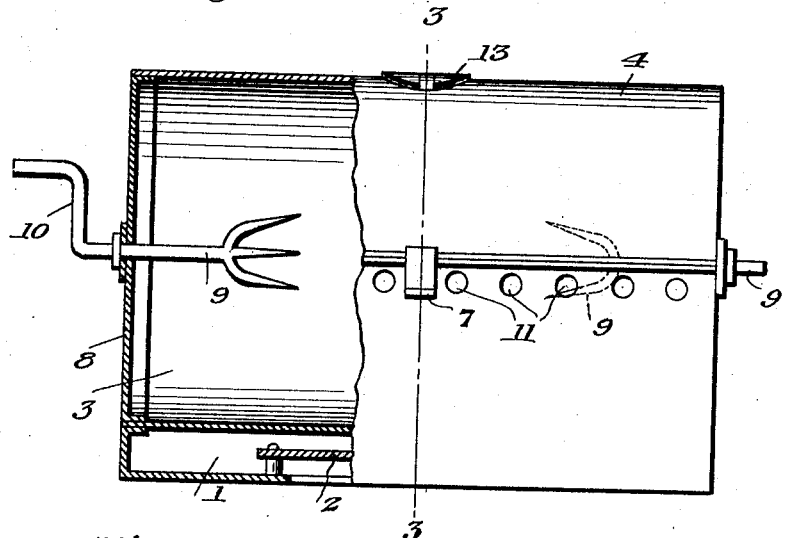
Figure 1 is a side view with parts broken away.
Figure 2:
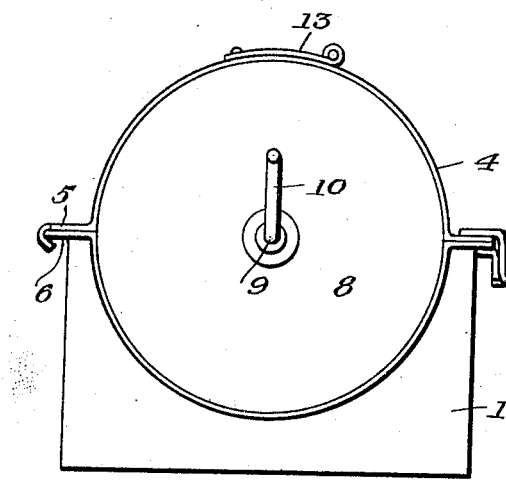
Fig. 2 is an end view.
Figure 3:
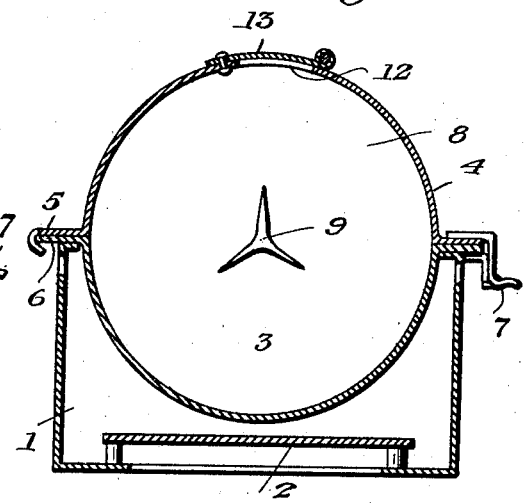
Fig. 3 is a section on line 3—3 of Fig. 1.

In these views 1 indicates the heating chamber which is made of substantially rectangular form with a baffle plate 2 in its bottom. 3 indicates a cylindrical chamber having its lower half located in the heating chamber and its upper half forming a removable cover 4 which is provided with a hooked flange 5 on one side for engaging the flange 6 on the heating chamber and having a catch 7 on its other side. Each end of this chamber is formed of one circular piece as indicated at 8 and forked rods 9 pass through these ends with the forks in the cylindrical chamber. One of these forks has its outer end cranked to provide the handle 10. The chamber 1 may be provided with the circulating holes 11 at its upper edge. The article to be cooked is placed in the cylindrical chamber 3 and is engaged by the forks on the rods 9. The cover is then closed and the receptacle placed on a stove. At intervals the handle 10 is turned to turn the article being roasted.

The cover is provided with an observation hole 12 which is provided with a shutter 13 so that the article being cooked may be inspected from time to time.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A device of the class described comprising a heating chamber having an opening therein adapted to be placed over a burner, a cylindrical roasting chamber having side flanges removably supported on the heating chamber and having its lower portion projecting into said chamber, rotatable forked rods projecting through the ends of the roasting chamber and adapted to engage the article to be roasted, one of said rods having a handle thereon outside of the roasting chamber, a removable cover for the roasting chamber and an observation hole in said cover.

In testimony whereof I affix my signature.

ARTHUR A. GREENICK.